US010865282B2

(12) United States Patent
Okamoto et al.

(10) Patent No.: US 10,865,282 B2
(45) Date of Patent: Dec. 15, 2020

(54) ION EXCHANGE MEMBRANE, METHOD FOR PRODUCING ION EXCHANGE MEMBRANE, AND ELECTROLYZER

(71) Applicant: ASAHI KASEI KABUSHIKI KAISHA, Tokyo (JP)

(72) Inventors: Koji Okamoto, Tokyo (JP); Kazuya Takahashi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 133 days.

(21) Appl. No.: 16/219,100

(22) Filed: Dec. 13, 2018

(65) Prior Publication Data

US 2019/0203002 A1   Jul. 4, 2019

(30) Foreign Application Priority Data

Dec. 18, 2017 (JP) ................................ 2017-242110
Nov. 5, 2018 (JP) ................................ 2018-208437

(51) Int. Cl.
*C08J 5/22* (2006.01)
*B01D 69/12* (2006.01)
(Continued)

(52) U.S. Cl.
CPC .............. *C08J 5/225* (2013.01); *B01D 69/12* (2013.01); *B01D 69/148* (2013.01); *B01D 71/024* (2013.01); *B01D 71/32* (2013.01); *C08J 5/2237* (2013.01); *C08J 5/2293* (2013.01); *C08J 7/0423* (2020.01); *C08J 7/0427* (2020.01); *C25B 1/16* (2013.01); *C25B 1/26* (2013.01); *C25B 1/46* (2013.01); *C25B 9/08* (2013.01); *C25B 9/10* (2013.01); *C25B 13/08* (2013.01); *B01D 2323/26* (2013.01); *B01D 2323/36* (2013.01); *B01D 2325/22* (2013.01); *B01D 2325/30* (2013.01); *B01D 2325/42* (2013.01); *C08J 2327/18* (2013.01); *C08J 2427/18* (2013.01)

(58) Field of Classification Search
CPC ........ C08J 5/225; C08J 5/2293; C08J 5/2237; C08J 7/0423; C08J 7/0427; B01D 69/12; B01D 69/148; B01D 71/024; B01D 71/32; C25B 1/16; C25B 1/26; C25B 1/46; C25B 9/10; C25B 9/08; C25B 13/08
USPC ........................................................... 521/27
See application file for complete search history.

(56) References Cited

U.S. PATENT DOCUMENTS

| | | | | |
|---|---|---|---|---|
| 4,323,434 A | * | 4/1982 | Yoshida ................. | C08J 5/2287 205/522 |
| 5,087,345 A | * | 2/1992 | Kashiwada ............ | C08J 5/2281 204/295 |
| 2016/0279627 A1 | * | 9/2016 | Kusano ................... | B01J 47/12 |

FOREIGN PATENT DOCUMENTS

| | | |
|---|---|---|
| JP | S55-110786 A | 8/1980 |
| JP | 62146926 A * | 6/1987 |

(Continued)

*Primary Examiner* — Michael Bernshteyn
(74) *Attorney, Agent, or Firm* — Greenblum & Bernstein, P.L.C.

(57) ABSTRACT

An ion exchange membrane includes: a membrane main body including a fluorine-containing polymer having an ion exchange group; and a coating layer arranged on at least one face of the membrane main body; wherein the coating layer includes inorganic particles and a binder, a mass ratio of the binder to the total mass of the inorganic particles and the binder in the coating layer is more than 0.3 and 0.9 or less, and a surface roughness of the coating layer is 1.20 µm or more.

7 Claims, 4 Drawing Sheets

(51) Int. Cl.
*C25B 1/16* (2006.01)
*C25B 1/26* (2006.01)
*C25B 9/10* (2006.01)
*C25B 13/08* (2006.01)
*B01D 71/02* (2006.01)
*C25B 9/08* (2006.01)
*C25B 1/46* (2006.01)
*B01D 69/14* (2006.01)
*B01D 71/32* (2006.01)
*C08J 7/04* (2020.01)

(56) References Cited

FOREIGN PATENT DOCUMENTS

| | | | |
|---|---|---|---|
| JP | H03-137136 A | | 6/1991 |
| JP | 04124291 A | * | 4/1992 |
| JP | 2014-058707 A | | 4/2014 |
| JP | 2016-079453 A | | 5/2016 |
| WO | 2015/098769 A | | 7/2015 |
| WO | 2017/179664 A | | 10/2017 |

* cited by examiner

ION EXCHANGE MEMBRANE, METHOD FOR PRODUCING ION EXCHANGE MEMBRANE, AND ELECTROLYZER

TECHNICAL FIELD

The present invention relates to an ion exchange membrane, a method for producing an ion exchange membrane, and an electrolyzer.

BACKGROUND ART

Fluorine-containing ion exchange membranes, which have excellent heat resistance and chemical resistance, are used as electrolytic diaphragms for alkali chloride electrolysis, ozone generation electrolysis, fuel cells, water electrolysis, and hydrochloric acid electrolysis in various applications, further extending to new applications.

Of these, in alkali chloride electrolysis for producing chlorine and alkali hydroxide, ion exchange membrane process has been predominant recently. Additionally, in order to reduce the electric power consumption rate, natural-circulation zero-gap base electrolyzers including an ion exchange membrane, an anode, and a cathode in close contact one another have become predominant for alkali chloride electrolysis by ion exchange membrane process. For ion exchange membranes used in alkali chloride electrolysis, required are various capabilities. Of these, cation exchange membranes having a low electrolytic voltage have been required particularly. The electrolytic voltage of alkali chloride electrolysis markedly affects the electric power consumption rate, and thus even a reduction of 10 mV is enormously beneficial. In alkali chloride electrolysis, it is generally known that gas generated from electrolytic reaction adsorbs the surface of the ion exchange membrane to thereby increase the electrolytic voltage. As a countermeasure against this, Patent Literature 1 suggests that gas adsorption onto the surface of an ion exchange membrane is suppressed and the electrolytic voltage is reduced by providing a layer containing a binder and inorganic particles (surface layer) on the surface of the membrane.

CITATION LIST

Patent Literature

Patent Literature 1 Japanese Patent Laid-Open No. 2016-79453

SUMMARY OF INVENTION

Technical Problem

Patent Literature 1 mentions that, when the mass ratio of a binder to the total of the inorganic particles and the binder contained in the surface layer is 0.3 or less, a high suppression effect on gas adsorption can be obtained. However, when the binder ratio is larger than 0.3, a sufficient suppression effect on gas adsorption cannot be achieved, and problematically, the electrolytic voltage significantly rises. As mentioned above, conventional arts still require improvements, from the viewpoint of a further reduction in the electrolytic voltage.

The present invention has been made in view of the above problem, and it is an object of the present invention to provide an ion exchange membrane, a method for producing an ion exchange membrane, and an electrolyzer that enable a reduction in electrolytic voltage when subjected to electrolysis.

Solution to Problem

As a result of intensive studies to solve the problem, the present inventors have found that when the surface of a coating layer containing inorganic particles has roughness equal to or higher than a certain level, a suppression effect on gas adsorption can be provided. The present inventors have made further intensive studies based on this result to have finally found that when the size of droplets to be applied in forming a coating layer falls within an optimum range, the surface roughness of the coating layer can be equal to or higher than a certain level even when a binder ratio is increased, to thereby complete the present invention.

That is, the present invention is as follows.

[1]
An ion exchange membrane comprising:
a membrane main body comprising a fluorine-containing polymer having an ion exchange group; and
a coating layer arranged on at least one face of the membrane main body;
wherein the coating layer comprises inorganic particles and a binder,
a mass ratio of the binder to a total mass of the inorganic particles and the binder in the coating layer is more than 0.3 and 0.9 or less, and
a surface roughness of the coating layer is 1.20 μm or more.

[2]
The ion exchange membrane according to [1], wherein the inorganic particles are particles comprising at least one mineral selected from the group consisting of oxides of Periodic Table Group IV elements, nitrides of Periodic Table Group IV elements, and carbides of Periodic Table Group IV elements.

[3]
The ion exchange membrane according to [1] or [2], wherein the inorganic particles are particles of zirconium oxide.

[4]
The ion exchange membrane according to any of [1] to [3], wherein
the membrane main body comprises: a layer S comprising a fluorine-containing polymer having a sulfonic acid group; a layer C comprising a fluorine-containing polymer having a carboxylic acid group; and a plurality of strengthening materials arranged inside the layer S and functioning as at least one of reinforcement yarn and sacrifice yarn;
wherein A and B, both of which are defined below, satisfy following formula (1):

$$2.0 \leq B/A \leq 5.0 \tag{1}$$

wherein, when the ion exchange membrane is viewed
from the top surface,
A represents an average cross-sectional thickness of the membrane measured in pure water for a region, in which the strengthening materials do not exist, and
B represents an average cross-sectional thickness of the membrane measured in pure water for a region, in which strands of the reinforcement yarn overlap with each other, and for a region, in which the reinforcement yarn overlaps with the sacrifice yarn.

[5]

A method for producing an ion exchange membrane, comprising spraying a coating solution comprising inorganic particles, a binder, and a solvent by a spray system, followed by drying thereof to form a coating layer on a surface of the membrane main body, wherein an average droplet size during the spraying is 100 µm or less.

[6]

A method for producing an ion exchange membrane, comprising spraying a coating solution comprising inorganic particles, a binder, and a solvent by a spray system, followed by drying thereof to form a coating layer on a surface of the membrane main body, wherein a surface temperature of the membrane main body during the drying is 40° C. or more and equal to or less than a boiling point of the solvent.

[7]

An electrolyzer comprising the ion exchange membrane according to any of [1] to [4].

Advantageous Effect of Invention

According to the present invention, it is possible to provide an ion exchange membrane, a method for producing an ion exchange membrane, and an electrolyzer that enable a reduction in electrolytic voltage when subjected to electrolysis.

DESCRIPTION OF EMBODIMENTS

Figure 1:
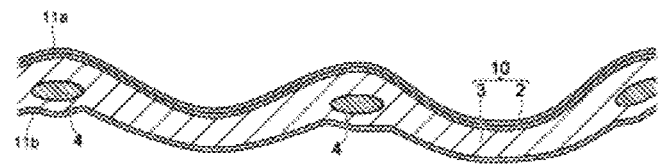
FIG. 1 illustrates a schematic cross-sectional view showing one embodiment of an ion exchange membrane.

Hereinafter, an embodiment for carrying out the present invention (hereinafter, referred to simply as "the present embodiment") will be described in detail. The following present embodiment is by way of illustration for describing the present invention and is not intended to limit the present invention to the following content. The present invention may be modified and implemented as appropriate within the gist thereof.

Note that identical reference numerals are used to denote identical or corresponding components in the description of drawings and the associated description is not repeated. The positional relation such as up and down, left and right, or the like is based upon the positional relation shown in the figures unless otherwise indicated. The dimensional ratios in the drawings are not limited to those illustrated in the drawings. However, the drawings merely illustrate one example of the present embodiment, and the present embodiment is not intended to be construed as being limited thereto.

The ion exchange membrane of the present embodiment comprises a membrane main body comprising a fluorine-containing polymer having an ion exchange group, and a coating layer arranged on at least one face of the membrane main body, wherein the coating layer comprises inorganic particles and a binder, the mass ratio of the binder to the total mass of the inorganic particles and the binder in the coating layer is more than 0.3 and 0.9 or less, and the surface roughness of the coating layer is 1.20 µm or more. As thus constituted, the ion exchange membrane of the present embodiment can reduce the electrolytic voltage when subjected to electrolysis. The ion exchange membrane of the present embodiment and an electrolyzer including the same thus can be preferably used in alkali chloride electrolysis (particularly salt electrolysis).

FIG. 1 illustrates a schematic cross-sectional view showing one embodiment of an ion exchange membrane. An ion exchange membrane 1 of the present embodiment has a membrane main body 10 comprising a fluorine-containing polymer having an ion exchange group, and coating layers 11a and 11b formed on either side of the membrane main body 10.

As illustrated in FIG. 1, in the ion exchange membrane 1, the membrane main body 10 may comprise a sulfonic acid layer 3 having an ion exchange group derived from a sulfo group (group represented by —$SO_3$—, hereinafter, referred to also as "sulfonic acid group") and a carboxylic acid layer 2 having an ion exchange group derived from a carboxyl group (group represented by —$CO_2$—, hereinafter, referred to also as "carboxylic acid group") and furthermore may have strength and dimension stability reinforced by a strengthening material 4 mentioned below. When the ion exchange membrane 1 comprises the sulfonic acid layer 3 and the carboxylic acid layer 2, the membrane tends to develop superior performance as an ion exchange membrane.

The ion exchange membrane of the present embodiment is not limited to the configuration illustrated in FIG. 1 and may have only either one of a sulfonic acid layer or a carboxylic acid layer. The ion exchange membrane of the present embodiment may not be necessarily reinforced by a strengthening material, and the arranged state of such a strengthening material is not limited to the example shown in FIG. 1. Additionally, the coating layer may not be necessarily provided on both the faces of the membrane main body and may be provided on only one surface of the membrane main body.

(Membrane Main Body)

First, the membrane main body 10 constituting the ion exchange membrane of the present embodiment 1 will be described.

The membrane main body 10 is only required to have a function of allowing cations to selectively permeate and comprise a fluorine-containing polymer having an ion exchange group. The configuration and material thereof are not particularly limited, and various known fluorine-containing polymers may be selected and used as appropriate.

The fluorine-containing polymer having an ion exchange group in the membrane main body 10 can be obtained from a fluorine-containing polymer having an ion exchange group precursor which may become an ion exchange group by hydrolysis or the like. Specifically, the membrane main body 10 can be obtained by preparing a precursor of the membrane main body 10 using, for example, a polymer that has a main chain composed of a fluorinated hydrocarbon and groups that can be converted into ion exchange groups by hydrolysis or the like (ion exchange group precursors) as pendant side chains and is melt-processable (hereinafter, optionally referred to as a "fluorine-containing polymer (a)") and then converting the ion exchange group precursors into ion exchange groups.

The fluorine-containing polymer (a) can be produced, for example, by copolymerizing at least one monomer selected from the following first group with at least one monomer selected from the following second group and/or the following third group. Alternatively, the polymer (a) can be produced also by homopolymerizing one monomer selected from any of the following first group, the following second group, and the following third group.

Examples of the monomer in the first group include, but not limited to, fluorinated vinyl compounds. Examples of the fluorinated vinyl compound include, but not limited to, vinyl fluoride, tetrafluoroethylene, hexafluoropropylene, vinylidene fluoride, trifluoroethylene, chlorotrifluoroethylene, and perfluoro(alkyl vinyl ethers). Particularly, when the ion exchange membrane of the present embodiment is used for alkali electrolysis, the fluorinated vinyl compound is preferably a perfluoro monomer. A perfluoro monomer selected from the group consisting of tetrafluoroethylene, hexafluoropropylene, and perfluoro(alkyl vinyl ethers) is preferable.

Examples of the monomer in the second group include, but not limited to, vinyl compounds having functional groups that may be converted to carboxylic acid-type ion exchange groups (carboxylic acid groups). Examples of the vinyl compound having functional groups that may be converted to carboxylic acid groups include, but not limited to, monomers represented by $CF_2=CF(OCF_2CYF)_s-O(CZF)_t-COOR$, wherein s represents an integer of 0 to 2, t represents an integer of 1 to 12, Y and Z each independently represent F or $CF_3$, and R represents a lower alkyl group. Such a lower alkyl group is, for example, an alkyl group having 1 to 3 carbon atoms.

Of these, compounds represented by $CF_2=CF(OCF_2CYF)_n-O(CF_2)_m-COOR$ are preferable. Herein, n represents an integer of 0 to 2, m represents an integer of 1 to 4, Y represents F or $CF_3$, and R represents $CH_3$, $C_2H_5$, or $C_3H_7$.

It should be noted that when the ion exchange membrane according to the present embodiment is used as an ion exchange membrane for alkali electrolysis, it is preferred to use at least a perfluoro compound as a monomer. However, the alkyl group in the ester group (see the above R) is eliminated from the polymer on hydrolysis, and thus, the alkyl group (R) may not be a perfluoro alkyl group in which all the hydrogen atoms have been replaced by fluorine atoms.

As the monomers in the second group, among the above compounds, monomers shown below are more preferred:
$CF_2=CFOCF_2-CF(CF_3) OCF_2COOCH_3$,
$CF_2=CFOCF_2CF(CF_3)O(CF_2)_2COOCH_3$,
$CF_2=CF[OCF_2-CF(CF_3)]_2O(CF_2)_2COOCH_3$,
$CF_2=CFOCF_2CF(CF_3)O(CF_2)_3COOCH_3$,
$CF_2=CFO(CF_2)_2COOCH_3$, and
$CF_2=CFO(CF_2)_3COOCH_3$.

Examples of monomers in the third group include vinyl compounds having functional groups that may be converted to sulfone-type ion exchange groups (sulfonic acid groups). As the vinyl compound having functional groups that may be converted to sulfonic acid groups, for example, monomers represented by $CF_2=CFO-X-CF_2-SO_2F$ are preferable, wherein X represents a perfluoroalkylene group. Specific examples thereof include the monomers shown below:
$CF_2=CFOCF_2CF_2SO_2F$,
$CF_2=CFOCF_2CF(CF_3)OCF_2CF_2SO_2F$,
$CF_2=CFOCF_2CF(CF_3)OCF_2CF_2CF_2SO_2F$,
$CF_2=CF(CF_2)_2SO_2F$,
$CF_2=CFO[CF_2CF(CF_3)O]_2CF_2CF_2SO_2F$, and
$CF_2=CFOCF_2CF(CF_2OCF_3)OCF_2CF_2SO_2F$.

Of these, $CF_2=CFOCF_2CF(CF_3)OCF_2CF_2CF_2SO_2F$ and $CF_2=CFOCF_2CF(CF_3)OCF_2CF_2SO_2F$ are more preferred.

Copolymers that can be obtained from these monomers can be produced by a polymerization method developed for homopolymerization and copolymerization of fluorinated ethylene, particularly, a common polymerization method that is used for tetrafluoroethylene. For example, in a non-aqueous method, a polymerization reaction can be carried out by using an inert solvent such as perfluorohydrocarbons and chlorofluorocarbons in the presence of a radical polymerization initiator such as perfluorocarbon peroxides and azo compounds and under conditions of a temperature of 0 to 200° C. and a pressure of 0.1 to 20 MPa.

In the above copolymerization, the type and ratio of the above monomers are not particularly limited and can be selected and determined depending on the type and amount of the functional group that is desired to be imparted to a fluorine-containing polymer to be obtained. For example, in the case of a fluorine-containing polymer containing only carboxylic acid groups, it is only required to select at least one monomer from each of the first group and the second group described above and copolymerize the monomers. Alternatively, in the case of a fluorine-containing polymer containing only sulfonic acid groups, it is only required to select at least one monomer from each of the first group and the third group described above and copolymerize the monomers. Furthermore, in the case of a fluorine-containing polymer containing carboxylic acid groups and sulfonic acid groups, it is only required to select at least one monomer from each of the first group, the second group, and the third group described above and copolymerize the monomers. In this case, an intended fluorine-containing polymer can also be obtained by separately producing a copolymer composed of the first group and the second group described above and a copolymer composed of the first group and the third group described above and then mixing the copolymers. The ratio of each monomer to be mixed is not particularly limited. In order to increase the amount of functional groups per unit polymer, it is only required to increase the proportion of monomers selected from the second group and the third group described above.

The total ion exchange capacity of the fluorine-containing polymer is not particularly limited, and is preferably 0.5 mg equivalent/g or more and 2.0 mg equivalent/g or less, more preferably 0.6 mg equivalent/g or more and 1.5 mg equivalent/g or less. The total ion exchange capacity herein refers to the equivalents of exchange groups per unit weight of a dry resin and can be determined by neutralization titration or the like.

In the membrane main body 10 of the ion exchange membrane 1 illustrated in FIG. 1, the sulfonic acid layer 3 containing a fluorine-containing polymer having a sulfonic acid group and the carboxylic acid layer 2 containing a fluorine-containing polymer having a carboxylic acid group are laminated. In the case of the membrane main body 10 having such a layer structure, the selective permeability of cations such as sodium ions tends to be further improved.

When the ion exchange membrane 1 illustrated in FIG. 1 is arranged in an electrolyzer, the membrane 1 is usually arranged such that the sulfonic acid layer 3 is located on the anode side of the electrolyzer and the carboxylic acid layer 2 is located on the cathode side of the electrolyzer.

The sulfonic acid layer 3 is preferably constituted by a material having low electrical resistance, and preferably has a membrane thickness larger than that of the carboxylic acid layer 2 from the viewpoint of membrane strength. The membrane thickness of the sulfonic acid layer 3 is preferably twice or more and 25 times or less that of carboxylic acid layer 2, more preferably three times or more and 15 times or less.

The carboxylic acid layer 2 preferably has a high anion elimination property even if having a small membrane thickness. The anion elimination property referred to herein is a property of preventing intrusion and permeation of anion to the ion exchange membrane 1. In order to improve the anion elimination property, it is effective to provide a carboxylic acid layer having a smaller ion exchange capacity on the sulfonic acid layer or the like.

As a fluorine-containing polymer for use in the sulfonic acid layer 3, it is preferable to use a polymer obtained by using, for example, $CF_2=CFOCF_2CF(CF_3)OCF_2CF_2SO_2F$ as a monomer in the third group.

As a fluorine-containing polymer for use in the carboxylic acid layer 2, it is preferable to use a polymer obtained by using, for example, $CF_2=CFOCF_2CF(CF_2)O(CF_2)_2COOCH_3$ as a monomer in the second group.

(Coating Layer)

The ion exchange membrane of the present embodiment has a coating layer provided on at least one face of the membrane main body. Further, in the ion exchange membrane 1 illustrated in FIG. 1, coating layers 11a and 11b are formed on either face of the membrane main body 10.

The coating layer in the present embodiment contains inorganic particles and a binder. The surface roughness of the coating layer is 1.20 μm or more. The surface roughness of the coating layer herein means a value to be calculated by a measurement method described in examples mentioned below. In the present embodiment, when the surface roughness described above is sufficiently high, it is possible to suppress gas adsorption to the ion exchange membrane during electrolysis, and as a result, it is possible to sufficiently reduce the electrolytic voltage. From the similar viewpoint, the surface roughness described above is preferably 1.25 μm or more, more preferably 1.30 μm or more. The upper limit of the surface roughness described above is not particularly limited, and is preferably 2.50 μm or less, from the viewpoint of delamination resistance.

The surface roughness of the coating layer in the present embodiment is not limited to the following. For example, as mentioned below, sufficiently reducing the average droplet size of a coating solution during the spraying of the coating solution by sprayer enables the surface roughness to be adjusted in the range described above.

The average particle size of the inorganic particles in the present embodiment is not particularly limited and is preferably 0.90 μm or more. When the average particle size of the inorganic particles is 0.90 μm or more, the durability to impurities tends to be further improved. In the present embodiment, inorganic particles having irregular shape are preferably used, and inorganic particles obtained by pulverizing raw stones are more preferably used.

The average particle size of the inorganic particles also can be 2 μm or less. When the average particle size of the inorganic particles is 2 μm or less, it is more likely to be able to further prevent damage in the membrane caused by the inorganic particles. The average particle size of the inorganic particles is more preferably 0.90 μm or more and 1.2 μm or less. The average particle size is still more preferably 1 μm or more and 1.2 μm or less.

In the present description, the average particle size means a median diameter (D50) and can be measured with a particle size analyzer ("SALD2200", SHIMADZU CORPORATION).

The inorganic particles in the present embodiment are preferably hydrophilic. Hydrophilicity refers a property of a solid surface to easily moisten with water. Generally, those having a small contact angle can be evaluated as hydrophilic. For example, inorganic particles having a contact angle of the order of 90° can be evaluated as hydrophilic. The contact angle is preferably 90° or less, more preferably 40° or less. The contact angle herein means an angle formed by the tangent line of the liquid surface at a contact between a solid and a liquid and the solid surface. A contact angle meter ("DMo-601" manufactured by Kyowa Interface Science Co., Ltd.) can be used to bring a droplet into contact with a solid surface and analyze the image of the droplet on contact to thereby calculate the contact angle. When the inorganic particles are hydrophilic, aligning the particles to the surface of the coating layer tends to enable gas adsorption to the ion exchange membrane during electrolysis to be more suppressed. The inorganic particles more preferably contain at least one mineral selected from the group consisting of oxides of Periodic Table Group IV elements, nitrides of Periodic Table Group IV elements, and carbides of Periodic Table Group IV elements. Specific examples thereof include, but not limited to, zirconium oxide, silica oxide, tin oxide, titanium oxide, nickel oxide, SiC, and ZrC. From the viewpoint of durability, particles of zirconium oxide are further preferable.

The inorganic particles in the present embodiment are preferably inorganic particles produced by pulverizing raw stones of the inorganic particles. Note that inorganic particles are produced by melting and purifying the raw stones of the inorganic particles and spherical particles having a uniform particle size can be also used as inorganic particles in the coating layer.

Examples of the pulverizing method include, but not particularly limited to, a ball mill, beads mill, colloid mill, conical mill, disc mill, edge mill, grain mill, hammer mill, pellet mill, VSI mill, Wiley mill, roller mill, and jet mill. The inorganic particles after pulverization are preferably washed, and, as the washing method at this time, acid treatment is preferable. This treatment can reduce impurities such as iron attached to the surface of the inorganic particles.

In the present embodiment, the coating layer contains a binder. The binder is a component that retains the inorganic particles on the surface of the ion exchange membrane to form a coating layer. The binder preferably contains a fluorine-containing polymer, from the viewpoint of the resistance to a liquid electrolyte and products from electrolysis. As a fluorine-containing polymer to be contained as the binder in the coating layer, a polymer of the same type as the fluorine-containing polymer constituting the membrane main body may be used, or a polymer of a different type may be used. In addition to such fluorine-containing polymers, as the binder component in the coating layer, various known compounds may be employed, but the content of the fluorine-containing polymer in the binder is preferably 90% by mass or more.

The binder in the present embodiment is more preferably a fluorine-containing polymer having carboxylic acid groups or sulfonic acid groups, from the viewpoint of the resistance to a liquid electrolyte and products from electrolysis and adhesion to the surface of the ion exchange membrane. When a coating layer is provided on a layer containing a fluorine-containing polymer having sulfonic acid groups (sulfonic acid layer), a fluorine-containing polymer having sulfonic acid groups is further preferably used as the binder in the coating layer. Alternatively, when a coating layer is provided on a layer containing a fluorine-containing polymer having carboxylic acid groups (carboxylic acid layer), a fluorine-containing polymer having carboxylic acid groups is further preferably used as the binder in the coating layer.

In the present embodiment, the mass ratio of the binder to the total mass of the inorganic particles and the binder in the coating layer is more than 0.3 and 0.9 or less. The present inventors have found that an increase in the mass ratio of the binder described above in the coating layer reduces the ion permeability resistance of the ion exchange membrane in itself. In other words, when the mass ratio of the binder exceeds 0.3, the ion permeability resistance of the ion exchange membrane in itself is further reduced. Thus, this reduction, in combination with increasing in the surface roughness of the coating layer as mentioned above, can markedly reduce the electrolytic voltage. From the similar viewpoint, the mass ratio of the binder is preferably more than 0.3 and 0.7 or less, more preferably 0.4 or more and 0.6 or less.

The distribution density of the coating layer in the ion exchange membrane is not particularly limited, and is preferably 0.05 mg or more and 2 mg or less per 1 $cm^2$, more preferably 0.5 mg or more and 2 mg or less per 1 $cm^2$. The distribution density described above can be measured by a method described in examples mentioned below. Additionally, the distribution density described above can be adjusted within the range described above by, for example, changing the amount to be discharged during the spraying for application or changing the number of recoating.

(Strengthening Material)

The ion exchange membrane of the present embodiment preferably has a strengthening material arranged inside the membrane main body.

In the present embodiment, the strengthening material functions as at least one of reinforcement yarn and sacrifice yarn. Examples thereof include, but not limited to, fabric formed by weaving reinforcement yarn and sacrifice yarn. Disposing the strengthening material inside the membrane main body enables, in particular, expansion and contraction of the ion exchange membrane to be controlled within a desired range. Such an ion exchange membrane does not expand and contract more than required on electrolysis and the like and can maintain excellent dimension stability for a long period.

The configuration of the strengthening material is not particularly limited, and the strengthening material may be formed by, for example, spinning yarn called reinforcement yarn. The reinforcement yarn herein referred to is a member that constitutes the strengthening material, the member being yarn that can impart desired dimension stability and mechanical strength to the ion exchange membrane and additionally can be present stably in the ion exchange membrane. Use of a strengthening material formed by spinning such reinforcement yarn can impart further excellent dimension stability and mechanical strength to the ion exchange membrane.

The strengthening material and materials of reinforcement yarn used therefor are not particularly limited and are preferably materials resistant to acid and alkali and the like. From the viewpoint of heat resistance and chemical resistance over a long term, fibers constituted by a fluorine-containing polymer are preferable.

As the fluorine-containing polymer to be used in the strengthening material, those used in the membrane main body mentioned above can be used as well. Examples thereof particularly include polytetrafluoroethylene (PTFE), tetrafluoroethylene-perfluoro alkyl vinyl ether copolymers (PFA), tetrafluoroethylene-ethylene copolymers (ETFE), tetrafluoroethylene-hexafluoropropylene copolymers, trifluorochlorethylene-ethylene copolymers, and vinylidene fluoride polymers (PVDF). Of these, particularly from the viewpoint of heat resistance and chemical resistance, fibers constituted by polytetrafluoroethylene are preferably employed.

The yarn diameter of the reinforcement yarn to be used in the strengthening material is not particularly limited and preferably 20 to 300 deniers, more preferably 50 to 250 deniers. The weaving density (number of strands of yarn inserted per unit length) is preferably 5 to 50 strands/inch. The form of the strengthening material is not particularly limited, and woven fabric, non-woven fabric, knitted fabric or the like is used, for example. However, the form of woven fabric is preferable. Woven fabric having a thickness of preferably 30 to 250 μm, more preferably 30 to 150 μm is used.

As the woven fabric or knitted fabric, monofilaments, multifilaments, or yarn and slit yarn thereof or the like can be used. Various weaving methods can be used, such as plain weave, leno weave, knitted weave, cord weave, and seersucker.

The weaving method and arrangement for the strengthening material in the membrane main body are not particularly limited. An appropriately and suitably arrangement can be employed in consideration of the size and shape of the ion exchange membrane, physical properties required for the ion exchange membrane, an environment of usage and the like.

For example, the strengthening material may be arranged along a predetermined direction of the membrane main body. From the viewpoint of the dimension stability, it is preferred that a strand of the strengthening material be arranged along a predetermined first direction and another strand of the strengthening material be arranged along a second direction substantially perpendicular to the first direction. A plurality of strands of the strengthening material is arranged inside the longitudinal-direction membrane main body so as to substantially directly run. This can impart further excellent dimension stability and mechanical strength in many directions. For example, an arrangement is preferred in which the strengthening material arranged along the longitudinal direction (warps) is interwoven with the reinforcement yarn arranged along the lateral direction (wefts) on the surface of the membrane main body. The arrangement is more preferably in the form of plain weave woven by allowing warps and wefts to run over and under each other alternately, leno weave in which two warps are woven into wefts while twisted, basket weave woven by inserting, into two or more parallelly-arranged warps, wefts of the same number, or the like, from the viewpoint of dimension stability and mechanical strength.

Particularly, the strengthening material is preferably arranged along both the machine direction (MD) and the transverse direction (TD) of the ion exchange membrane. That is, the reinforcement yarn is preferably plain-woven in the MD and the TD. The MD herein refers to the direction in which the membrane main body and strengthening material are carried (flow direction) in the production step of ion exchange membrane described below, and the TD refers to the direction substantially perpendicular to the MD. Yarn woven along the MD is referred to as MD yarn, and yarn woven along the TD is referred to as TD yarn. The ion exchange membrane used in electrolysis is usually rectangular. Thus, frequently, its longitudinal direction is the MD, and the width direction is the TD. By interweaving the strengthening material as MD yarn into the strengthening material as TD yarn, it is possible to impart further excellent dimension stability and mechanical strength in many directions.

The arrangement interval for the strengthening material is not particularly limited. The strengthening material can be appropriately and suitably arranged in consideration of physical properties required for the ion exchange membrane, an environment of usage and the like.

The aperture ratio of the strengthening material is not particularly limited and is preferably 30% or more, more preferably 50% or more and 90% or less. The aperture ratio is preferably 30% or more from the viewpoint of the electrochemical properties of the ion exchange membrane and preferably 90% or less from the viewpoint of the mechanical strength of the ion exchange membrane.

The aperture ratio of the strengthening material is a ratio of a total area of a surface through which substances such as ions (a liquid electrolyte and cations contained therein (e.g., sodium ions)) can pass (B) to the area of either one surface of the membrane main body (A) (B/A). The total area of a surface through which substances such as ions can pass (B) can be the total area of the region in the ion exchange membrane in which the cations, liquid electrolyte, and the like are not interrupted by the strengthening material included in the ion exchange membrane or the like.

Figure 2:
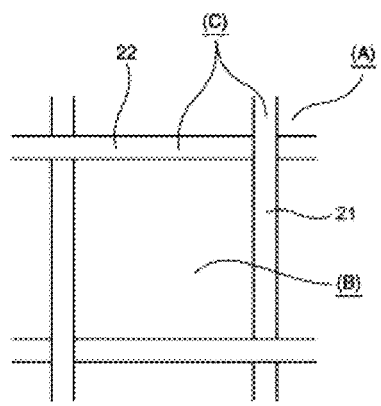
FIG. 2 illustrates a schematic view for illustrating an aperture ratio of a strengthening material that may constitute the ion exchange membrane.

FIG. 2 illustrates a schematic view for illustrating an aperture ratio of a strengthening material that constitutes the ion exchange membrane. FIG. 2, in which a portion of the ion exchange membrane is enlarged, shows only the arrangement of the strengthening materials 21 and 22 in the region, omitting illustration of the other members.

Subtraction of the total area of the strengthening materials (C) from the area of the region surrounded by the strengthening material 21 arranged along the longitudinal direction and the strengthening material 22 arranged along the lateral direction (A), which region includes the area of the strengthening materials, can determine the total area of the region through which substances such as ions can pass (B) in the area of the region mentioned above (A). That is, the aperture ratio can be determined by the following formula (I):

Aperture ratio=$(B)/(A)=((A)-(C))/(A)$ (I).

Of strengthening materials, particularly preferred forms are tape yarn and highly-oriented monofilaments containing PTFE from the viewpoint of chemical resistance and heat resistance. Specifically, the strengthening material is more preferably a strengthening material formed by plain-weaving using 50 to 300 deniers of tape yarn obtained by slitting a high-strength porous sheet made of PTFE into a tape form or a highly-oriented monofilament made of PTFE at a weaving density of 10 to 50 strands/inch and having a thickness in the range of 50 to 100 μm. The aperture ratio of the ion exchange membrane including such strengthening material is further preferably 60% or more.

Examples of the shape of the reinforcement yarn include round yarn and tape yarn. Preferably, the yarn is round yarn.

(Continuous Hole)

The ion exchange membrane of the present embodiment preferably has continuous holes inside the membrane main body.

The continuous holes are holes that may serve as a flow path for cations generated during electrolysis and a liquid electrolyte. Additionally, continuous holes, which are tubular holes formed inside the membrane main body, are formed by dissolution of the strengthening material (sacrifice yarn) mentioned below. The shape, diameter, and the like of the continuous holes can be controlled by selecting the shape and diameter of the strengthening material (sacrifice yarn).

Forming continuous holes in the ion exchange membrane can ensure the mobility of alkali ions generated during electrolysis and a liquid electrolyte. The shape of the continuous holes is not particularly limited, but, according to the production method described below, may be the shape of the strengthening material (sacrifice yarn) to be used for formation of the continuous holes.

In the present embodiment, the continuous holes are preferably formed so as to alternately penetrate the anode side of the strengthening material (sulfonic acid layer side) and through the cathode side (carboxylic acid layer side). Such a structure enables cations (e.g., sodium ions) transferred through the liquid electrolyte filling the continuous holes to flow also to the cathode side of strengthening material, in a portion in which continuous holes are formed on the cathode side of the strengthening material. As a result, the flow of the cations is not interrupted, and thus, it is possible to further reduce the electrical resistance of the ion exchange membrane.

The continuous holes may be formed along only one predetermined direction of the membrane main body constituting the ion exchange membrane of the present embodiment, but, from the viewpoint of exerting more stable electrolytic performance, the continuous holes are preferably formed both in the longitudinal direction and the lateral direction of the membrane main body.

(Average Cross-Sectional Thickness of Membrane)

In the present embodiment, the membrane main body comprises a sulfonic acid layer comprising a fluorine-containing polymer having sulfonic acid groups (layer S), a carboxylic acid layer comprising a fluorine-containing polymer having carboxylic acid groups (layer C), and a plurality of strengthening materials arranged inside the layer S and functioning as at least one of reinforcement yarn and sacrifice yarn, wherein A and B, both of which are defined below, preferably satisfy following formula (1):

$2.0 \leq B/A \leq 5.0$ (1)

wherein, when the ion exchange membrane of the present embodiment is viewed from the top surface, A represents an average cross-sectional thickness of the membrane measured in pure water for a region, in which strengthening materials do not exist, and B represents an average cross-sectional thickness of the membrane measured in pure water for a region, in which strands of the reinforcement yarn overlap with each other, and for a region, in which the reinforcement yarn overlaps with the sacrifice yarn.

[Average Cross-Sectional Thickness of Membrane A]

The average cross-sectional thickness of membrane A is calculated as follows.

Figure 3:
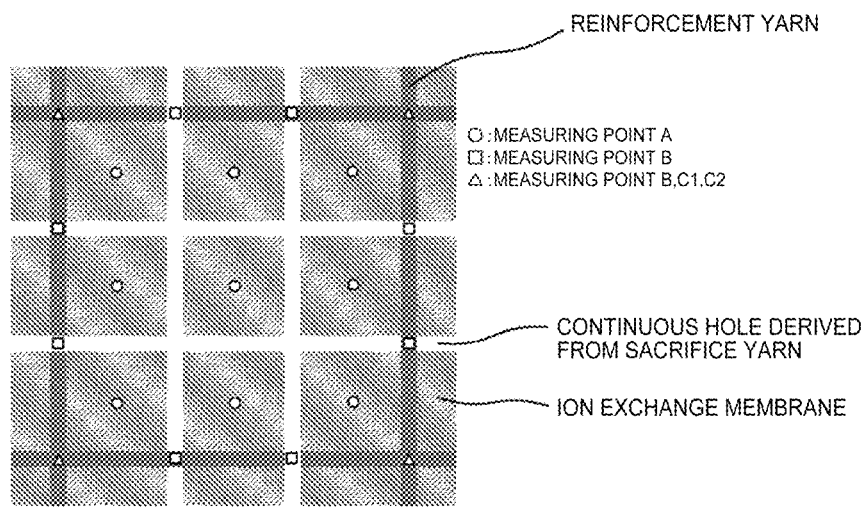
FIG. 3 illustrates a schematic top view showing one exemplary measurement position of the thickness of the membrane according to the present embodiment.
Figure 4:
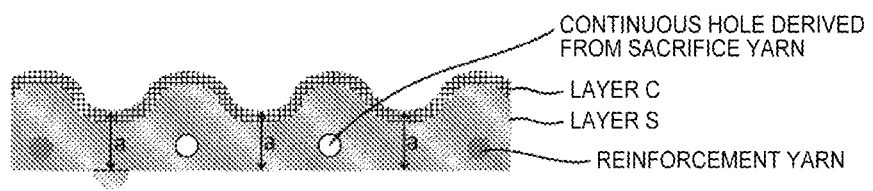
FIG. 4 illustrates a schematic cross-sectional view showing one exemplary measurement position of the thickness a of the ion exchange membrane according to the present embodiment.
Figure 5:
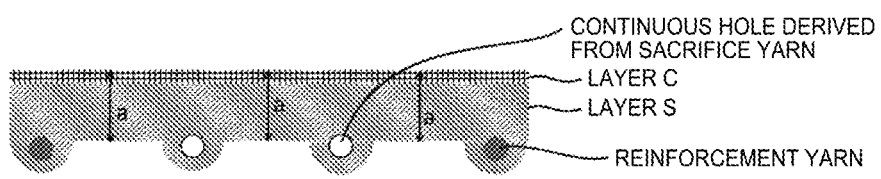
FIG. 5 illustrates a schematic cross-sectional view showing one exemplary measurement position of the thickness a of the ion exchange membrane according to the present embodiment.

The position represented by "○" in FIG. 3 corresponds to the center of a region, in which neither reinforcement yarn nor sacrifice yarn constituting a reinforcement material exists (a window portion) when the ion exchange membrane is viewed from the top surface, and thickness a is measured at this position. The thickness a, as shown in FIG. 4 or FIG. 5, corresponds to a thickness of the membrane measured in pure water at this position in the cross-sectional direction of the membrane. When raised portions formed only of an ion exchange resin, which constitutes the ion exchange membrane, exist on the surface of the layer S, the distance from the surface of the layer C to the base of the raised portions is taken as the thickness a.

As for a method for measuring the thickness a, a slice having a width of about 100 μm may be cut off from a cross section of a target portion of the ion exchange membrane immersed in pure water in advance by means of a razor or the like, subsequently the slice may be immersed in pure water with its cross section facing upward, and then the thickness of the slice may be measured using a microscope or the like. Alternatively, a tomographic image of a target portion of the ion exchange membrane immersed in pure water observed using X-ray CT or the like may be used to measure the thickness.

The thickness a was measured at 15 points, and the thickness of the portion having the smallest thickness is taken as a (min).

a (min) is determined at three different positions, and the average value thereof is the thickness A.

The value A described above can be measured by the method described above, either before the coating layer is formed or after formed, in the present embodiment.

From the viewpoint of securing sufficient membrane strength, the thickness A is preferably 40 μm or more, more preferably 50 μm or more.

The thickness A can be within the aforementioned preferred range by, for example, controlling the thickness each of the layer S and the layer C, or alternatively by setting production conditions (temperature conditions and extension ratio) on production of the ion exchange membrane (in particular, on lamination of the film and strengthening material) within an appropriate range described below or the like. More specifically, for example, when the film temperature on lamination is increased, the thickness A tends to be smaller. When the extension ratio on extension is reduced, the thickness A tends to be larger. The temperature conditions on lamination and the extension ratio on extension are not limited to those described above and preferably adjusted as appropriate, in consideration of the flow characteristics and the like of a fluorine-containing polymer to be used.

[Average Cross-Sectional Thickness of Membrane B]

The average cross-sectional thickness of membrane B is calculated as follows.

Figure 6:
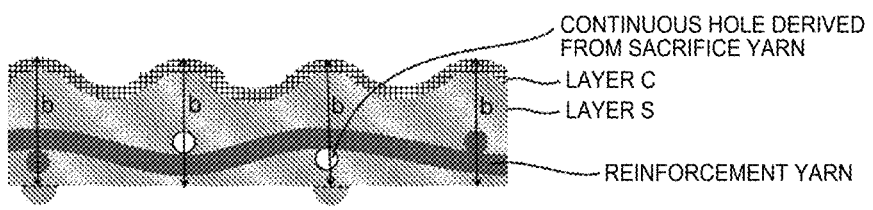
FIG. 6 illustrates a schematic cross-sectional view showing one exemplary measurement position of the thickness b of the ion exchange membrane according to the present embodiment.
Figure 7:
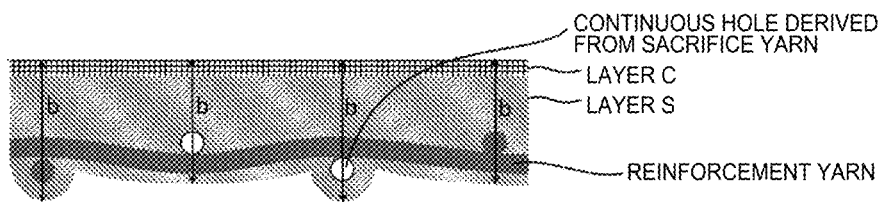
FIG. 7 illustrates a schematic cross-sectional view showing one exemplary measurement position of the thickness b of the ion exchange membrane according to the present embodiment.

The position represented by "△" in FIG. 3 corresponds to a region, in which strands of the reinforcement yarn constituting a strengthening material overlap with each other, and the position represented by "☐" in FIG. 1 corresponds to a region, in which the reinforcement yarn overlaps with the sacrifice yarn, the both yarn constituting a strengthening material. At both of the positions, a thickness b is measured. The thickness b, as shown in FIG. 6 or FIG. 7, corresponds to the thickness of the membrane measured in pure water at a point having the largest thickness in this region in the cross-sectional direction of the membrane. When raised portions formed only of an ion exchange resin, which constitutes the ion exchange membrane, exist on the surface of the layer S, the distance from the surface of the layer C to the base of the raised portions is taken as the thickness b. The example shown in FIG. 7 corresponds to a case in which raised portions formed of an ion exchange resin constituting the ion exchange membrane and a strengthening material exist on the surface of the layer S, and the distance from the surface of the layer C to the tip of a raised portion is taken as the thickness b.

As for a method for measuring the thickness b, a slice having a width of about 100 μm may be cut off from a cross section of a target portion of an ion exchange membrane immersed in pure water in advance, by means of a razor or the like, subsequently the slice may be immersed in pure water with its cross section facing upward, and then the thickness of the slice may be measured using a microscope or the like. Alternatively, a tomographic image of a target portion of an ion exchange membrane immersed in pure water observed using X-ray CT or the like may be used to measure the thickness.

The thickness b was measured at 15 points, and the thickness of the portion having the largest thickness is taken as b (max).

b (max) is determined at three different positions, and the average value thereof is the thickness B.

The value B described above can be measured by the method described above, either before the coating layer is formed or after formed, in the present embodiment.

In alkali chloride electrolysis using a zero-gap base electrolyzer, the distance between the electrodes is determined by the thickness of the ion exchange membrane. Thus, when the average cross-sectional thickness of membrane B is large, the resistance between electrodes tends to increase to thereby lead to an increase in the electrolytic voltage. Thus, the thickness B is preferably a thickness of 260 μm or less, more preferably 240 μm or less, still more preferably 220 μm or less.

The thickness B can be within the aforementioned preferred range by, for example, controlling the thickness each of the layer S and the layer C or alternatively by setting the yarn diameter of the strengthening material and the production conditions (temperature conditions and extension ratio) on production of the ion exchange membrane (in particular, on lamination of a film and a strengthening material) within an appropriate range described below or the like. More specifically, for example, when the outside air temperature on lamination is lowered, the thickness B tends to be smaller. When the extension ratio on extension is reduced, the thickness B tends to be larger. The temperature conditions on lamination and the extension ratio on extension are not limited to those described above and preferably adjusted as appropriate, in consideration of the flow characteristics and the like of a fluorine-containing polymer to be used.

[Thickness Ratio B/A]

A thickness ratio B/A is a value obtained by dividing the average cross-sectional thickness of membrane B by the average cross-sectional thickness of membrane A.

When B/A is increased, the thickness of a window portion through which cations permeate tends to become smaller to enable the electrolytic voltage to be reduced. Accordingly, B/A is preferably 2.0 or more, more preferably 2.3 or more, more preferably 2.5 or more.

Meanwhile, when asperities on the surface of the membrane become extremely large, and bubbles of the gas generated from the alkali chloride electrolysis are likely to accumulate in the window portion, which is a recess, and the gas adsorbs the surface of the ion exchange membrane and tends to prevent permeation of cations. From the viewpoint of preventing this and sufficiently reducing the electrolytic voltage, B/A is preferably 5.0 or less, more preferably 4.5 or less, still more preferably 4.0 or less.

[Production Method]

The method of producing an ion exchange membrane according to the present embodiment is not particularly limited as long as an ion exchange membrane having the configuration mentioned above can be obtained, and the ion exchange membrane is preferably produced by a method involving the following step (1) to step (6):

step (1): a step of producing a fluorine-containing polymer having an ion exchange group or an ion exchange group precursor which may become an ion exchange group by hydrolysis;

step (2): as required, a step of obtaining a strengthening material in which sacrifice yarn, which is soluble in acid or alkali and forms continuous holes, is arranged between adjacent strands of reinforcement yarn by interweaving at least a plurality of strands of the reinforcement yarn and the sacrifice yarn;

step (3): a step of forming a film from the fluorine-containing polymer having an ion exchange group or an ion exchange group precursor which may become an ion exchange group by hydrolysis;

step (4): a step of embedding the strengthening material in the film to obtain a membrane main body including the strengthening material arranged therein, as required;

step (5): a step of hydrolyzing the membrane main body obtained in the step (4) (hydrolysis step); and step (6): a step of providing a coating layer on the membrane main body obtained in the step (5) (coating step).

The method of producing an ion exchange membrane of the present embodiment is mainly characterized by reducing the average droplet size during the spraying of a coating solution in the coating step (6). Hereinafter, each of the steps will be described in detail.

Step (1): Step of Producing Fluorine-Containing Polymer

In the step (1), starting material monomers described in the first group to the third group described above are used to produce a fluorine-containing polymer. In order to control the ion exchange capacity of the fluorine-containing polymer, it is only required that the mixture ratio of the starting material monomers be adjusted in production of the fluorine-containing polymer constituting each layer.

Step (2): Step of Producing Strengthening Material

A strengthening material is woven fabric obtained by weaving reinforcement yarn, and the like. Embedding the strengthening material in the membrane can provide a membrane main body including the strengthening material therein. To produce an ion exchange membrane having continuous holes, a strengthening material into which sacrifice yarn also has been woven is employed. The amount of the sacrifice yarn mix-woven in this case is preferably 10 to 80% by mass, more preferably 30 to 70% by mass based on the total strengthening material. Weaving the sacrifice yarn thereinto can also prevent yarn slippage of the strengthening material.

As the sacrifice yarn, which has solubility in the step of producing a membrane or under an electrolysis environment, rayon, polyethylene terephthalate (PET), cellulose, polyamide, and the like are employed. Also preferred is polyvinyl alcohol or the like having a thickness of 20 to 50 deniers and composed of monofilaments or multifilaments.

Note that, in the step (2), adjusting the arrangement of the strengthening material can control the aperture ratio, continuous hole arrangement, and the like.

Step (3): Step of Film Formation

In the step (3), a film is formed from the fluorine-containing polymer obtained in the step (1) by use of an extruder. The film may have a single-layer structure, a two-layer structure of a sulfonic acid layer and a carboxylic acid layer as mentioned above, or a multilayer structure of three or more layers.

Examples of the method for forming a film include the following:

a method in which a fluorine-containing polymer having carboxylic acid groups and a fluorine-containing polymer having sulfonic acid groups are each used to form a separate film; and a method in which a fluorine-containing polymer having carboxylic acid groups and a fluorine-containing polymer having sulfonic acid groups are coextruded to form a composite film.

Note that a plurality of films may be provided by each method. Coextruding films of different types is preferable because of its contribution to an increase in the adhesive strength in the interface.

Step (4): Step of Obtaining Membrane Main Body

In the step (4), the strengthening material obtained in the step (2) is embedded in the film obtained in the step (3) to obtain a membrane main body including the strengthening material therein.

Examples of a method for forming a membrane main body include (i) a method in which a fluorine-containing polymer having carboxylic acid group precursors located on the cathode side (e.g., carboxylate functional groups) (hereinafter, a layer constituted by the polymer is referred to as a first layer) and a fluorine-containing polymer having sulfonic acid group precursors (e.g., sulfonyl fluoride functional groups) (hereinafter, a layer constituted by the polymer is referred to as a second layer) are used to form a film by a coextrusion process, a strengthening material and the second layer/first layer composite film are laminated in this order, via a breathable heat-resistant release paper, on a flat plate or drum having many micropores on the surface thereof and, using a heat source and a vacuum source used as required, are integrated at a temperature at which each of the polymers melts while the air among each of the layers was evacuated by reduced pressure; and (ii) a method in which, separately from the second layer/first layer composite film, a fluorine-containing polymer having sulfonic acid group precursors (third layer) is used singly to form a film in advance, the third layer film, a strengthening material, and the composite film constituted by the second layer/first layer are laminated in this order, via a breathable heat-resistant release paper, on a flat plate or drum having many micropores on the surface thereof and, using a heat source and a vacuum source used as required, are integrated at a temperature at which each of the polymers melts while the air among each of the layers was evacuated by reduced pressure.

Coextruding the first layer and the second layer herein is preferable because of its contribution to an increase in the adhesive strength in the interface.

The method including integration under reduced pressure is preferable because the thickness of the third layer on the strengthening material tends to be larger than that of a pressure-application press method. Furthermore, the mechanical strength of the ion exchange membrane tends to be able to be sufficiently maintained because the strengthening material is fixed on the inner surface of the membrane main body.

A variety of laminations described herein is exemplary. After an appropriate and suitable lamination pattern (for example, combination of each of layers) is selected in consideration of the layer configuration and physical properties of a desired membrane main body and the like, coextrusion can be carried out.

For the purpose of further improving the electric properties of the ion exchange membrane, it is also possible to additionally interpose a fourth layer constituted by a fluorine-containing polymer having both carboxylic acid group precursors and sulfonic acid group precursors between the first layer and the second layer, or to use a fourth layer constituted by a fluorine-containing polymer having both carboxylic acid group precursors and sulfonic acid group precursors instead of the second layer.

The method for forming the fourth layer may be a method in which a fluorine-containing polymer having carboxylic acid group precursors and a fluorine-containing polymer having sulfonic acid group precursors are separately produced and then mixed, or may be a method in which a copolymer produced from a monomer having carboxylic acid group precursors and a monomer having sulfonic acid group precursors is used.

When the fourth layer is used as a component of the ion exchange membrane, a coextruded film of the first layer and the fourth layer is formed, the third layer and the second layer are each used separately from this to form a film singly, and the films may be laminated in the manner mentioned above. Alternatively, three layers of the first layer/fourth layer/second layer may be coextruded at once to form a film.

In this case, the direction in which the extruded film flows is the MD. In this manner, the membrane main body comprising a fluorine-containing polymer having an ion exchange group can be formed on the strengthening material.

Additionally, the ion exchange membrane of the present embodiment preferably has protruded portions constituted by the fluorine-containing polymer having sulfonic acid groups, that is, raised portions, on the surface side composed of the sulfonic acid layer. As a method for forming such raised portions on the surface of the membrane main body, which is not particularly limited, a known method can be employed including forming raised portions on a resin surface. Specifically, an example is a method including subjecting the surface of the membrane main body to embossing. For example, when the composite film, strengthening material and the like are integrated, the raised portions described above can be formed using release paper embossed in advance. In the case where raised portions are formed by embossing, the height and arrangement density of the raised portions can be controlled by controlling the emboss shape to be transferred (shape of the release paper).

(5) Hydrolysis Step

In the step (5), a step of hydrolyzing the membrane main body obtained in the step (4) to thereby convert the ion exchange group precursor into an ion exchange group (hydrolysis step) is performed.

Additionally, in the step (5), it is possible to form dissolution holes in the membrane main body by dissolving and removing the sacrifice yarn included in the membrane main body with acid or alkali. The sacrifice yarn may remain in the continuous holes, not completely dissolved and removed. Alternatively, the sacrifice yarn remaining in the continuous holes may be dissolved and removed by the liquid electrolyte when the ion exchange membrane is subjected to electrolysis.

The sacrifice yarn has solubility in acid or alkali in the step of producing an ion exchange membrane or under an electrolysis environment. Dissolution of the sacrifice yarn allows continuous holes to be formed at corresponding sites.

The step (5) can be carried out by immersing the membrane main body obtained in the step (4) in a hydrolysis solution containing acid or alkali. As the hydrolysis solution, a mixed solution containing KOH and dimethyl sulfoxide (DMSO) can be used, for example.

The mixed solution preferably contains KOH of 2.5 to 4.0 N and DMSO of 25 to 35% by mass.

The temperature for the hydrolysis is preferably 70 to 100° C. With a higher temperature, the apparent thickness can be made larger. The temperature is more preferably 85 to 100° C.

The time for the hydrolysis is preferably 10 to 120 minutes. With a longer time, the apparent thickness can be made larger. The time is more preferably 20 to 120 minutes.

Figure 8:
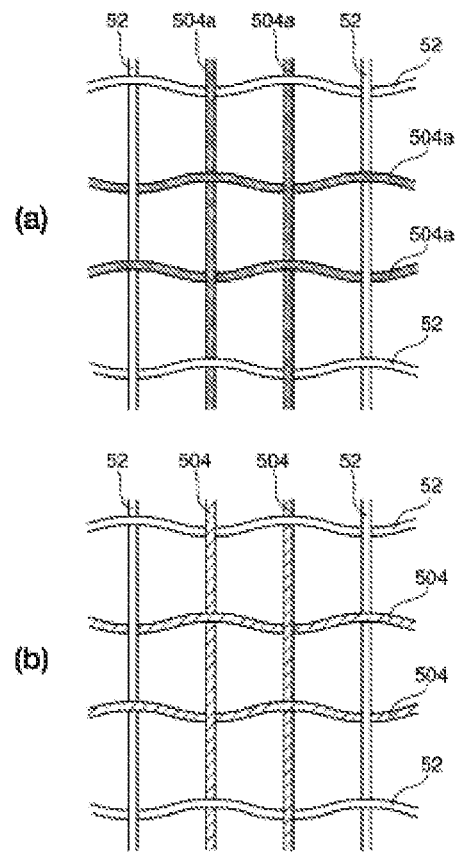
FIG. 8 illustrates a schematic view for illustrating a method for forming continuous holes of the ion exchange membrane.

The step of forming continuous holes by dissolution of the sacrifice yarn will be now described in more detail. FIGS. 8(a) and 8(b) illustrate schematic views for illustrating a method for forming continuous holes of the ion exchange membrane according to the present embodiment.

FIGS. 8(a) and 8(b) show reinforcement yarn 52, sacrifice yarn 504a, and continuous holes 504 to be formed by the sacrifice yarn 504a only, omitting illustration of the other members such as a membrane main body.

First, the reinforcement yarn 52 and the sacrifice yarn 504a for forming continuous holes 504 in the ion exchange membrane are interknitted to form a strengthening material. Then, in the step (5), the sacrifice yarn 504a is dissolved to form the continuous holes 504.

The method described above is simple because interknitting of the reinforcement yarn 52 and the sacrifice yarn 504a may be adjusted depending on the arrangement of the reinforcement yarn and continuous holes in the membrane main body of the ion exchange membrane.

FIG. 8(a) exemplifies the plain-woven strengthening material in which the reinforcement yarn 52 and sacrifice yarn 504a are interwoven along both the longitudinal direction and the lateral direction in the paper, and the arrangement of the reinforcement yarn 52 and the sacrifice yarn 504a in the strengthening material may be varied as required.

(6) Coating Step

In the step (6), a coating solution containing inorganic particles, a binder, and a solvent is sprayed by a spray system and dried to thereby form a coating layer on the surface of the membrane main body.

In the present embodiment, the average droplet size of the coating solution during the spraying is preferably set at 100 μm or less. In the present embodiment, from the viewpoint of further reducing ion permeability resistance of the ion exchange membrane in itself, the mass ratio of the binder to the total mass of the inorganic particles and the binder in the coating solution described above is preferably more than 0.3 and 0.9 or less. From the similar viewpoint, the mass ratio of the binder is more preferably 0.3 or more and 0.7 or less. Since the mass ratio of the binder in the coating solution as the feed ratio described above corresponds to the binder proportion after the coating layer is formed, the binder proportion in coating layer in the ion exchange membrane can be identified from the feed ratio.

In the present embodiment, making the droplets during the spraying sufficiently small reduces the thickness of the binder layer existing around the inorganic particles contained in the droplets. When the droplets in that state are brought into contact with the membrane main body, the inorganic particles become likely to be exposed on the surface. Accordingly, the inorganic particles are likely to be aligned on the surface side of the coating layer to be formed. In this manner, making the droplets during the spraying sufficiently small can make the surface roughness of the coating layer sufficiently high, despite of use of the coating solution having a high binder proportion.

Specifically, when the average droplet size is set at 100 μm or less, the thickness of the binder layer existing around the inorganic particles contained in the droplets tends to be prevented from excessively increasing. The droplets in that state come in contact with the membrane main body, and thus, inconvenience is difficult to occur in which the inorganic particles are embedded in the binder and thus become unlikely to be exposed on the surface. Accordingly, the inorganic particles are likely to be aligned on the surface side of the coating layer to be formed. In this manner, making the droplets during the spraying small tends to be able to make the surface roughness of the coating layer sufficiently high, even when a coating solution having a high binder proportion is used.

From the viewpoint mentioned above, the average droplet size described above is preferably 80 μm or less, more preferably 50 μm or less.

The average droplet size described above can be measured by a method described in examples. Additionally, the average droplet size described above can be adjusted in the range described above, for example, by the nozzle diameter of the spray or the like.

In the present embodiment, when the surface temperature of the membrane main body of the ion exchange membrane as the substrate (hereinafter, referred to also as "substrate surface temperature") is low in drying the coating layer, drying of the coating layer is not facilitated even if the average droplet size during the spraying is small, and droplets landed are more likely to adhere to one another. Thus, the surface roughness may become lower.

Accordingly, when a coating solution having a high binder proportion is used, from the viewpoint of sufficiently increase the surface roughness, it is preferable not only to reduce the droplet size during the spraying but also to perform drying with the substrate surface temperature raised.

Furthermore, when the substrate surface temperature is excessively high, the coating layer is likely to become brittle and the coating layer is likely to be dropped off. When the substrate surface temperature is excessively low, specifically less than 40° C., it tends to be difficult to make the surface roughness of the coating layer sufficiently high.

From the viewpoint mentioned above, the substrate surface temperature described above in drying the coating layer is preferably 40° C. or more and equal to or less than the boiling point of the solvent.

The substrate surface temperature described above can be measured with a contact-type thermometer. Additionally, the method of heating the substrate surface can be adjusted within the range described above by means of a heater, hot air, or the like.

From the viewpoint of adjusting the surface roughness of the coating layer in the ion exchange membrane of the present embodiment in a more preferable range, in the coating step (6), it is especially preferable to set the average droplet size of the coating solution during the spraying at 100 μm or less and to set the substrate surface temperature described above in drying the coating layer at 40° C. or more and equal to or less than the boiling point of the solvent.

As the inorganic particles, those obtained by pulverizing raw stones can be preferably used. As the binder, binders obtained by hydrolyzing a fluorine-containing polymer having ion exchange group precursors with an aqueous solution containing dimethyl sulfoxide (DMSO) and potassium hydroxide (KOH) and then immersing the polymer in hydrochloric acid to substitute the counter ions of the ion exchange groups with H+ (e.g., a fluorine-containing polymer having carboxylic groups or sulfo groups) can be preferably used. Such binders are preferable because of being more likely to dissolve in water or ethanol mentioned below.

This binder is preferably dissolved in a solution prepared by mixing water and ethanol, for example. Note that a volume ratio between water and ethanol is preferably 10:1 to 1:10, more preferably 5:1 to 1:5, still more preferably 2:1 to 1:2. The inorganic particles are dispersed with a ball mill into the dissolving liquid thus obtained to thereby obtain a coating solution. In this time, adjusting the time and rotational speed during dispersion also enables the average particle size of the inorganic particles and the like to be adjusted. Preferable amounts of inorganic particles and binder blended in that case are as mentioned above.

The concentration each of the inorganic particles and the binder in the coating solution is not particularly limited, but a dilute coating solution is preferable. With such a dilute coating solution, homogeneous application of the liquid on the surface of the ion exchange membrane can be achieved.

When the inorganic particles are dispersed, a surfactant may be added to the dispersion liquid. The surfactant is preferably a nonionic surfactant, and examples thereof include, but not limited to, HS-210, NS-210, P-210, and E-212 manufactured by NOF CORPORATION.

Application of the coating solution obtained on at least one surface of the membrane main body by spray application forms a coating layer, and thus, the ion exchange membrane of the present embodiment can be obtained.

[Electrolyzer]

Figure 9:
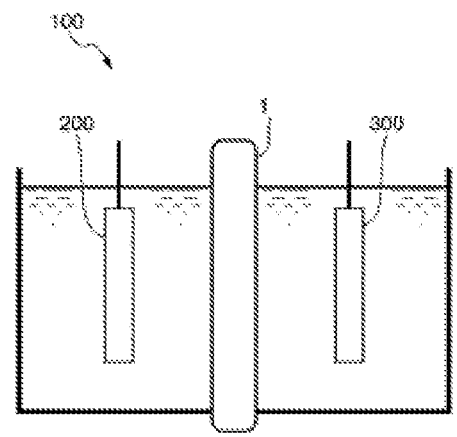
FIG. 9 illustrates a schematic cross-sectional view showing one embodiment of an electrolyzer.

The ion exchange membrane of the present embodiment can be used as a constituting member of an electrolyzer. That is, the electrolyzer of the present embodiment comprises the ion exchange membrane of the present embodiment. FIG. 9 illustrates a schematic view of one embodiment of an electrolyzer according to the present embodiment.

An electrolyzer 100 of the present embodiment includes at least an anode 200, a cathode 300, and an ion exchange membrane 1 of the present embodiment arranged between the anode 200 and the cathode 300. The electrolyzer 100 comprising the ion exchange membrane 1 described above is described herein by way of example. However, the present invention is not limited thereto and may be implemented by variously modifying the configuration thereof within the effect of the present embodiment.

The electrolyzer 100 can be used for various types of electrolysis, and as a typical example, a case when the electrolyzer is used for electrolysis of an alkali chloride aqueous solution will be described below.

Electrolysis conditions are not particularly limited, and the electrolysis can be carried out under known conditions. For example, with the anode chamber provided with a 2.5 to 5.5 N alkali chloride aqueous solution and the cathode chamber provided with water or diluted alkali hydroxide aqueous solution, electrolysis is carried out with a direct current.

The configuration of the electrolyzer according to the present embodiment is not particularly limited and may be monopolar or bipolar, for example. Materials constituting the electrolyzer 100 are not particularly limited. As materials for the anode chamber, titanium and the like, which are resistant to alkali chloride and chlorine, are preferable. As materials for the cathode chamber, nickel and the like, which are resistant to alkali hydroxide and hydrogen, are preferable. As for the arrangement of the electrodes, even when the ion exchange membrane 1 and the anode 200 are arranged with an appropriate gap therebetween or even when the anode 200 is arranged in contact with the ion exchange membrane 1, the ion exchange membrane 1 can be used without any problem. The cathode is generally arranged with an appropriate gap from the ion exchange membrane, but a contact-type electrolyzer having such a gap (zero-gap base electrolyzer) may be used without any problem.

EXAMPLES

Hereinafter, the present embodiment will be described further in detail based on examples. The present embodiment is not intended to be limited only to these examples.

Example 1

As reinforcement yarn, a yarn-like material prepared by twisting 100-denier tape yarn made of polytetrafluoroethylene (PTFE) at 900 turns/m (hereinafter, referred to as PTFE yarn) was used. As warp sacrifice yarn, yarn prepared by twisting polyethylene terephthalate (PET) of 35 deniers and 8 filaments at 200 turns/m (hereinafter, referred to as PET yarn) was used. As weft sacrifice yarn, yarn prepared by twisting polyethylene terephthalate (PET) of 35 deniers and 8 filaments at 200 turns/m (hereinafter, referred to as PET yarn) was used. First, plain-weaving was carried out with the PTFE yarn arranged at 24 strands/inch and two strands of the sacrifice yarn arranged between adjacent strands of the PTFE yarns to thereby obtain woven fabric having a thickness of 100 μm.

Then, provided were a polymer (A1) as a dried resin, which was a copolymer of $CF_2=CF_2$ and $CF_2=CFOCF_2CF(CF_3)OCF_2CF_2COOCH_3$ and had an ion exchange capacity of 0.85 mg equivalent/g and a polymer (B1) as a dried resin, which was a copolymer of $CF_2=CF_2$ and $CF_2=CFOCF_2CF(CF_3)OCF_2CF_2SO_2F$ and had an ion exchange capacity of 1.03 mg equivalent/g. These polymers (A1) and (B1) were used to obtain a two-layer film X having a thickness of the polymer (A1) layer of 20 μm and a thickness of the polymer (B1) layer of 94 μm, by a coextrusion T-die method. Note that the ion exchange capacity of each polymer indicates the ion exchange capacity when the ion exchange group precursors of each polymer were converted by hydrolysis into ion exchange groups.

A polymer was obtained, which was a copolymer of $CF_2=CF_2$ and $CF_2=CFO-CF_2CF(CF_3)O-(CF_2)_2-SO_2F$ and had an ion exchange capacity of 1.05 mg equivalent/g. This polymer was extruded through a single-layer T die to obtain a single-layer film Y having a thickness of 20 μm.

Subsequently, on a drum including a heat source and a vacuum source therein and having many micropores on the surface thereof, release paper embossed in advance, the film Y, a strengthening material (woven fabric obtained above), and the film X were laminated in the order mentioned and heated under reduced pressure for two minutes, under conditions of a drum temperature of 240° C. and a degree of reduced pressure of 0.067 MPa. Then, release paper was removed to thereby obtain a composite membrane having asperities. The composite membrane obtained was saponified by immersion in an aqueous solution at 90° C. containing dimethyl sulfoxide (DMSO) of 30% by mass and potassium hydroxide (KOH) of 15% by mass for an hour. Thereafter, the membrane was immersed in 0.5N NaOH at 90° C. for an hour to substitute ions attached to the ion exchange groups with Na and then washed with water. Further, the membrane was dried at 60° C. to thereby obtain a membrane main body.

Additionally, a polymer (B3) as a dried resin, which was a copolymer of $CF_2=CF_2$ and $CF_2=CFOCF_2CF(CF_3)OCF_2CF_2SO_2F$ and had an ion exchange capacity of 1.05 mg equivalent/g was hydrolyzed and then converted into its acid form with hydrochloric acid. In a solution obtained by dissolving this acidic-form polymer (B3) at a proportion of 5% by mass in a 50/50 (mass ratio) mixed solution of water and ethanol, zirconium oxide particles having a primary particle size of 1.15 μm were added so as to achieve a mass ratio of polymer (B3) to the total mass of the polymer (B3) and the zirconium oxide particles of 0.33. Thereafter, the zirconium oxide particles were dispersed with a ball mill until the average particle size in a suspension liquid reached 0.94 μm to thereby obtain the suspension liquid. Note that the zirconium oxide used was one obtained by pulverizing raw stones. Note that the average particle size described above was median diameter (D50) and was measured with a particle size analyzer ("SALD2200", SHIMADZU CORPORATION).

The suspension liquid was applied to both the surfaces of the ion exchange membrane by a spray method. In the meantime, the average droplet size of the spray was adjusted to 46 μm. Additionally, the surface temperature of the membrane main body was adjusted to 57° C. to dry the surfaces, and then, an ion exchange membrane having a coating layer including the polymer (B3) and the zirconium oxide particles was obtained. In this ion exchange membrane, the content of the fluorine-containing polymer in the binder was 100% by mass. Note that the average droplet size means the volume average diameter D (4,3). Here, droplets located between the nozzle tip and a point 200 mm away therefrom in the droplet discharge direction were regarded as targets for the measurement, and "Spraytec" manufactured by Malvern Ltd. was used under a 25° C. atmosphere to determine the droplet size from the laser scattered light intensity. Hereinafter, average droplet sizes were determined in the same manner.

As a result of the qualitative and quantitative analysis on elements existing in the coating layer after drying by X-ray fluorescence measurement, the application density was calculated to be 0.5 mg per 1 $cm^2$.

The surface roughness of the coating layer was measured with a laser microscope ("VK-9700" manufactured by KEYENCE CORPORATION). In other words, the line roughness was determined with the laser microscope. The waviness of the membrane main body was tilt-corrected to extract solely the coating roughness, and then, the surface roughness was determined. For determining the line roughness, when the coating layer surface was viewed from the above, four areas where no continuous hole derived from the reinforcement yarn and sacrifice yarn existed (i.e., the shaded portion in FIG. 3), the four areas being adjacent to each other, were regarded as targets for the measurement, and ten points therein were subjected to measurement with the measurement line width set at 20 μm to determine the average value. Additionally, for the tilt correction, a function of the laser microscope ("VK-9700" manufactured by KEYENCE CORPORATION) to correct a tilt when a measured target was tiled was used. As a result of the above, the surface roughness of the coating layer was 1.34 μm.

[Electrolysis Evaluation]

The electrolyzer for use in electrolysis was one in which four natural-circulation zero-gap electrolysis cells were arranged in series, each of which had a structure including an ion exchange membrane arranged between an anode and a cathode. As the cathode, woven mesh was used formed by knitting nickel fine wire having a diameter of 0.15 mm and coated with cerium oxide and ruthenium oxide as catalysts in a sieve mesh size of 50. To bring the cathode into close contact with the ion exchange membrane, a mat formed by knitting nickel fine wire was arranged between a collector made of nickel expanded metal and the cathode. As the anode, used was titanium expanded metal coated with ruthenium oxide, iridium oxide, and titanium oxide as catalysts. By use of the electrolyzer described above, saline was supplied to the anode side while the concentration was adjusted to be 205 g/L, and water was supplied to the cathode side while the sodium hydroxide concentration was maintained at 32% by mass. Electrolysis was carried out with the temperature of the electrolyzer set to 85° C., at a current density of 6 kA/m$^2$ under a condition in which the liquid pressure of the cathode side of the electrolyzer was higher than the liquid pressure of the anode side by 5.3 kPa. The pair voltage between the anode and the cathode of the electrolyzer was measured every day by a voltmeter TR-V1000 manufactured by KEYENCE CORPORATION. The average value for seven days was determined as the electrolytic voltage.

The ion exchange membrane having the dried coating layer was moistened so as to increase the weight by 2% by mass. Then, as a result of electrolysis performance evaluation on this ion exchange membrane, the voltage indicated was as low as 3.07 V.

[Measurement of Average Cross-Sectional Thickness of Membrane A]

The membrane obtained by removing the coating layer from the ion exchange membrane after formation of the coating layer was cut in the vertical direction from the layer C side or the layer S side to the surface of the layer to obtain a sample having a longer side of 6 mm or more and a shorter side of about 100 μm. At this time, as shown in FIG. 4, the sides of the sample were allowed to be parallel to four strands of the reinforcement yarn. The thickness of the sample in a water-containing state was measured using an optical microscope with a cross section facing upward. In this case, a portion to be cut off included two or more adjacent strands of the reinforcement yarn, two or more adjacent continuous holes (derived from the sacrifice yarn), and the center portion of the region surrounded by the strands of the reinforcement yarn and the continuous holes, which is a portion indicated by "○" in FIG. 3. A piece to be cut off included 6 or more strands of the reinforcement yarn perpendicular to the cutting direction. Such a piece was sampled at three positions. From the cross-sectional view of each of the pieces obtained, a was measured as shown in FIGS. 4 to 5 to calculate a (min) for each piece. The average cross-sectional thickness A was calculated from a (min) at three points to be 120 μm.

[Measurement of Average Cross-Sectional Thickness of Membrane B]

The membrane obtained by removing the coating layer from the ion exchange membrane after formation of the coating layer was cut in the vertical direction from the layer C side or the layer S side to the surface of the layer to obtain a sample having a longer side of 6 mm or more and a shorter side of about 100 μm. At this time, as shown in FIG. 4, the sides of the sample were allowed to be parallel to four strands of the reinforcement yarn. The thickness of the sample in a water-containing state was measured using an optical microscope with a cross section facing upward. In this case, a portion to be cut off was the center portion of the reinforcement yarn, which included portions indicated by □ or Δ in FIG. 3. A piece to be cut off included 15 or more strands of the reinforcement yarn perpendicular to the cutting direction. Such a piece was sampled at three positions. From the cross-sectional view of each of the pieces obtained, b was measured as shown in FIGS. 6 to 7 to calculate b (max) for each piece. The average cross-sectional thickness B was calculated from b (max) at three points to be 260 μm. That is, the value of B/A was 2.17.

Example 2

An ion exchange membrane was prepared in the same manner as in Example 1 except that the adjustment of the average droplet size of the spray was changed to 80 μm in Example 1. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.32 μm. Furthermore, the average cross-sectional thickness of membrane A, average cross-sectional thickness of membrane B, and A/B were measured in the same manner as in Example 1, and the results were 120 μm, 260 μm, and 2.17, respectively.

[Electrolysis Evaluation]

The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as low as 3.07 V.

Example 3

An ion exchange membrane was prepared in the same manner as in Example 1 except that a suspension liquid having a mass ratio of the polymer (B3) to the total mass of the polymer (B3) and the zirconium oxide particles of 0.4 was used in Example 1. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.49 μm. Furthermore, the average cross-sectional thickness of membrane A, average cross-sectional thickness of membrane B, and A/B were measured in the same manner as in Example 1, and the results were 120 μm, 260 μm, and 2.17, respectively.

[Electrolysis Evaluation]

The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as low as 3.06 V.

Example 4

An ion exchange membrane was prepared in the same manner as in Example 1 except that the adjustment of the average droplet size of the spray was changed to 80 μm in Example 3. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.24 μm. Furthermore, the average cross-sectional thickness of membrane A, average cross-sectional thickness of membrane B, and A/B were measured in the same manner as in Example 1, and the results were 120 μm, 260 μm, and 2.17, respectively.
[Electrolysis Evaluation]
The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as low as 3.07 V.

Example 5

An ion exchange membrane was prepared in the same manner as in Example 1 except that a suspension liquid having a mass ratio of the polymer (B3) to the total mass of the polymer (B3) and the zirconium oxide particles of 0.6 was used in Example 1. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.51 μm. Furthermore, the average cross-sectional thickness of membrane A, average cross-sectional thickness of membrane B, and A/B were measured in the same manner as in Example 1, and the results were 120 μm, 260 μm, and 2.17, respectively.
[Electrolysis Evaluation]
The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as low as 3.05 V.

Example 6

An ion exchange membrane was prepared in the same manner as in Example 3 except that the surface temperature of the membrane main body during the spraying was changed to 46° C. in Example 3. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.23 μm. Furthermore, the average cross-sectional thickness of membrane A, average cross-sectional thickness of membrane B, and A/B were measured in the same manner as in Example 1, and the results were 120 μm, 260 μm, and 2.17, respectively.
[Electrolysis Evaluation]
The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as low as 3.07 V.

Example 7

An ion exchange membrane was prepared in the same manner as in Example 1 except that a suspension liquid having a mass ratio of the polymer (B3) to the total mass of the polymer (B3) and the zirconium oxide particles of 0.7 was used in Example 1. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.36 μm. Furthermore, the average cross-sectional thickness of membrane A, average cross-sectional thickness of membrane B, and A/B were measured in the same manner as in Example 1, and the results were 120 μm, 260 μm, and 2.17, respectively.
[Electrolysis Evaluation]
The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as low as 3.07 V.

Comparative Example 1

An ion exchange membrane was prepared in the same manner as in Example 1 except that the adjustment of the average droplet size of the spray was changed to 154 μm in Example 1. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.19 μm. Furthermore, the average cross-sectional thickness of membrane A, average cross-sectional thickness of membrane B, and A/B were measured in the same manner as in Example 1, and the results were 120 μm, 260 μm, and 2.17, respectively.
[Electrolysis Evaluation]
The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as high as 3.09 V.

Comparative Example 2

An ion exchange membrane was prepared in the same manner as in Example 1 except that a suspension liquid having a mass ratio of the polymer (B3) to the total mass of the polymer (B3) and the zirconium oxide particles of 0.2 was used in Example 1. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.48 μm. Furthermore, the average cross-sectional thickness of membrane A, average cross-sectional thickness of membrane B, and A/B were measured in the same manner as in Example 1, and the results were 120 μm, 260 μm, and 2.17, respectively.

[Electrolysis Evaluation]

The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as high as 3.10 V.

Comparative Example 3

An ion exchange membrane was prepared in the same manner as in Example 1 except that a suspension liquid having a mass ratio of the polymer (B3) to the total mass of the polymer (B3) and the zirconium oxide particles of 0.2 was used and the adjustment of the average droplet size of the spray was changed to 154 μm in Example 1. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.18 μm. Furthermore, the average cross-sectional thickness of membrane A, average cross-sectional thickness of membrane B, and A/B were measured in the same manner as in Example 1, and the results were 120 μm, 260 μm, and 2.17, respectively.

[Electrolysis Evaluation]

The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as high as 3.10 V.

Comparative Example 4

An ion exchange membrane was prepared in the same manner as in Example 3 except that the adjustment of the average droplet size of the spray was changed to 154 μm in Example 3. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.12 μm. Furthermore, the average cross-sectional thickness of membrane A, average cross-sectional thickness of membrane B, and A/B were measured in the same manner as in Example 1, and the results were 120 μm, 260 μm, and 2.17, respectively.

[Electrolysis Evaluation]

The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as high as 3.16 V.

Comparative Example 5

An ion exchange membrane was prepared in the same manner as in Example 5 except that the adjustment of the average droplet size of the spray was changed to 154 μm in Example 5. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.13 μm. Furthermore, the average cross-sectional thickness of membrane A, average cross-sectional thickness of membrane B, and A/B were measured in the same manner as in Example 1, and the results were 120 μm, 260 μm, and 2.17, respectively.

[Electrolysis Evaluation]

The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as high as 3.15 V.

Comparative Example 6

An ion exchange membrane was prepared in the same manner as in Example 3 except that the surface temperature of the membrane main body during the spraying was changed to 25° C. in Example 3. In this ion exchange membrane, the content of the fluorine-containing polymer in the binder was 100% by mass.

The application density of the coating layer after drying was measured in the same manner as in Example 1, and the result was 0.5 mg per 1 cm$^2$. The surface roughness of the coating layer was also measured in the same manner as in Example 1, and the result was 1.07 μm. Furthermore, the average cross-sectional thickness of membrane A, average cross-sectional thickness of membrane B, and A/B were measured in the same manner as in Example 1, and the results were 120 μm, 260 μm, and 2.17, respectively.

[Electrolysis Evaluation]

The ion exchange membrane having the dried coating layer was moistened so as to increase the weight by 2% by mass. Then, electrolysis performance evaluation was carried out under the same conditions as in Example 1 except that this ion exchange membrane was used. As a result, the voltage indicated was as high as 3.11 V.

TABLE 1

|  | Example 1 | Example 2 | Example 3 | Example 4 | Example 5 | Example 6 | Example 7 |
|---|---|---|---|---|---|---|---|
| Binder ratio [—] | 0.33 | 0.33 | 0.4 | 0.4 | 0.6 | 0.4 | 0.7 |
| Substrate surface temperature °C. | 57 | 57 | 57 | 57 | 57 | 46 | 57 |
| Coating roughness [μm] | 1.34 | 1.32 | 1.49 | 1.24 | 1.51 | 1.23 | 1.36 |
| Average droplet size [μm] | 46 | 80 | 46 | 80 | 46 | 46 | 46 |
| Voltage [V] 90° C. *Zero-gap form | 3.07 | 3.07 | 3.06 | 3.07 | 3.05 | 3.07 | 3.07 |

|  | Comparative Example 1 | Comparative Example 2 | Comparative Example 3 | Comparative Example 4 | Comparative Example 5 | Comparative Example 6 |
|---|---|---|---|---|---|---|
| Binder ratio [—] | 0.33 | 0.2 | 0.2 | 0.4 | 0.6 | 0.4 |
| Substrate surface temperature °C. | 57 | 57 | 57 | 57 | 57 | 25 |
| Coating roughness [μm] | 1.19 | 1.48 | 1.18 | 1.12 | 1.13 | 1.07 |
| Average droplet size [μm] | 154 | 46 | 154 | 154 | 154 | 46 |
| Voltage [V] 90° C. *Zero-gap form | 3.09 | 3.10 | 3.10 | 3.16 | 3.15 | 3.11 |

Figure 10:
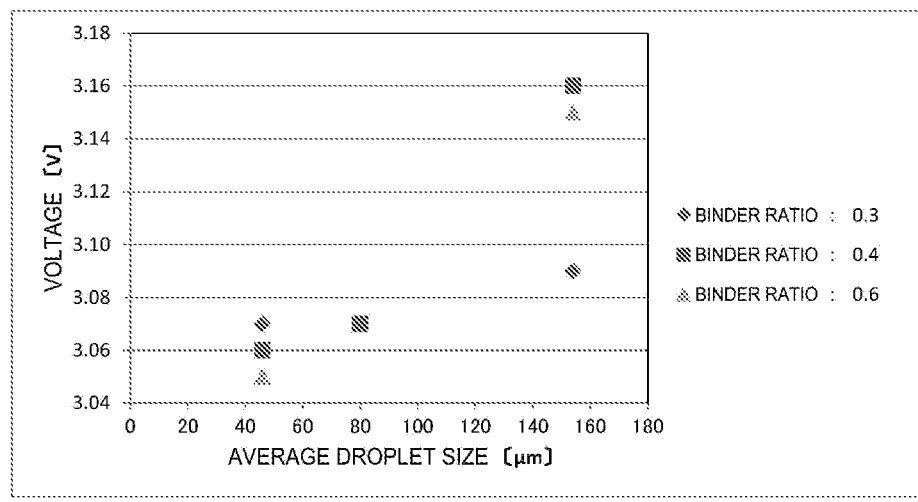
FIG. 10 illustrates a graph showing the relation between the average droplet size and the voltage of Examples 1 to 5 and Comparative Examples 1 to 5.

Based on the results described above, the relation between the average droplet size and the voltage of Examples 1 to 5 and Comparative Examples 1 to 5 (the substrate surface temperature was 57° C. in all of Examples and Comparative Examples) is shown in FIG. 10. In Examples in which the average droplet size was regulated to a desired value or less, the voltage tends to be lower as the binder ratio increases.

REFERENCE SIGNS LIST 1 ion exchange membrane
2 carboxylic acid layer
3 sulfonic acid layer
4 strengthening material
10 membrane main body
11a, 11b coating layer
21, 22 strengthening material
100 electrolyzer
200 anode
300 cathode
52 reinforcement yarn
504a sacrifice yarn
504 continuous hole

The invention claimed is:

1. An ion exchange membrane comprising:
   a membrane main body comprising a fluorine-containing polymer having an ion exchange group; and
   a coating layer arranged on at least one face of the membrane main body;
   wherein
   the coating layer comprises inorganic particles and a binder, wherein
      the average particle size of the inorganic particles is 0.90 μm or more and 2 μm or less, and
      a mass ratio of the binder to a total mass of the inorganic particles and binder in the coating layer is more than 0.3 and 0.9 or less, and a surface roughness of the coating layer is 1.20 μm or more.

2. The ion exchange membrane according to claim 1, wherein the inorganic particles are particles comprising at least one mineral selected from the group consisting of oxides of Periodic Table Group IV elements, nitrides of Periodic Table Group IV elements, and carbides of Periodic Table Group IV elements.

3. The ion exchange membrane according to claim 1, wherein the inorganic particles are particles of zirconium oxide.

4. The ion exchange membrane according to claim 1, wherein the membrane main body comprises:
   a layer S comprising a fluorine-containing polymer having a sulfonic acid group;
   a layer C comprising a fluorine-containing polymer having a carboxylic acid group; and
   a plurality of strengthening materials arranged inside the layer S and functioning as at least one of reinforcement yarn and sacrifice yarn;
   wherein A and B, both of which are defined below, satisfy following formula (1):

$$2.0 \leq B/A \leq 5.0 \tag{1}$$

wherein, when the ion exchange membrane is viewed from a top surface,
      A represents an average cross-sectional thickness of the membrane measured in pure water for a region, in which the strengthening materials do not exist, and
      B represents an average cross-sectional thickness of the membrane measured in pure water for a region, in which strands of the reinforcement yarn overlap with each other, and for a region, in which the reinforcement yarn overlaps with the sacrifice yarn.

5. A method for producing the ion exchange membrane according to claim 1, comprising
   spraying a coating solution comprising inorganic particles, a binder, and a solvent by a spray system, followed by
   drying thereof to form a coating layer on a surface of the membrane main body, wherein an average droplet size during the spraying is 100 μm or less.

6. The method for producing the ion exchange membrane according to claim 5, wherein a surface temperature of the membrane main body during the drying is 40° C. or more and equal to or less than a boiling point of the solvent.

7. A method of using the ion exchange membrane according to claim 1, comprising using the ion exchange membrane in an electrolyzer.

* * * * *